United States Patent Office 3,639,334
Patented Feb. 1, 1972

---

3,639,334
STABILIZATION OF POLYPHENYLENE ETHERS
Klaus E. Holoch, Psald, Germany, assignor to General Electric Company, New York, N.Y.
No Drawing. Continuation-in-part of abandoned application Ser. No. 425,330, Jan. 13, 1965. This application May 14, 1968, Ser. No. 728,914
Int. Cl. C08g 51/58, 51/60
U.S. Cl. 260—45.9
15 Claims

ABSTRACT OF THE DISCLOSURE

A polyphenylene ether composition stable to oxygen containing atmosphere at elevated temperatures comprising a polyphenylene ether and a stabilizing quantity of a material selected from the group consisting of phosphites, hydrazines, and mixtures thereof.

CROSS REFERENCE TO OTHER APPLICATIONS

This application is a continuation-in-part of U.S. patent application Ser. No. 425,330 filed Jan. 13, 1965, now abandoned.

BACKGROUND OF THE INVENTION

(1) Field of the invention

This invention relates to stabilized synthetic resins formed from phenols by oxidative coupling and has for its principle object, a polyphenylene ether composition stabilized with a member selected from the group consisting of phosphites, hydrazines, and mixtures thereof.

(2) Description of the prior art

The polyphenylene ethers are disclosed and claimed in U.S. Pats. Nos. 3,306,874 and 3,306,875 incorporated herein by reference. They are characterized by a unique combination of properties including outstanding mechanical, chemical and electrical properties over a broad temperature range. They show good resistance to common, aggressive organic solvents and are suitable for a large number of commercial applications.

Though possessing the outstanding properties noted above, it has been found that the stability of these polymers at elevated temperatures in oxidizing atmospheres is marginal; the elevated temperatures causing embrittlement and discoloration of the polymer.

Considerable literature is available on the subject of stabilizers which prevent chemical and physical changes in polymers. One article that summarizes conventional stabilizer compositions for various polymers is presented in Modern Plastics Encyclopedia for 1964, September 1963, volume 41, No. 1A, pages 405 to 409. The basic function of a stabilizer is to prevent change of properties during processing of a polymer and to protect the finished product from change in properties upon exposure to heat for a sustained period of time.

The effect of a particular stabilizer composition on a particular polymer is unpredictable. Therefore, one cannot look at the stabilizers of the prior art to predict their effect on a different polymer. Each polymer undergoes distinct, unpredictable and difficultly observable changes upon exposure to heat dependent upon the processing variables and chemical units of which the plastic is composed. This makes the selection of a stabilizer composition for a particular polymer difficult. For example, though the polyphenylene ethers are derived from phenols, those stabilizers known to be effective for most phenolic resins are unsuitable or provide only marginal improvement for the polyphenylene ethers.

SUMMARY OF THE INVENTION

The present invention is predicated upon the discovery that polyphenylene ethers are substantially more resistant to discoloration and embrittlement upon exposure to oxidizing atmospheres at elevated temperatures when compounded with a stabilizer selected from the group consisting of phosphites, hydrazines and mixtures thereof.

DESCRIPTION OF THE PREFERRED EMBODIMENTS

In a preferred embodiment, the polyphenylene ethers falling within the scope of this invention have the following general formula:

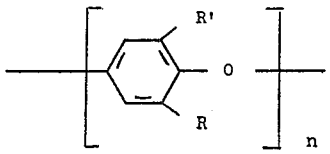

where R and R' are each monovalent substituents selected from the group consisting of hydrogen, halogen, hydrocarbon radicals, halohydrocarbon radicals having at least two carbon atoms between the halogen atom and phenol nucleus, hydrocarbonoxy radicals and halohydrocarbonoxy radicals having at least two carbon atoms between the halogen atom and phenol nucleus and $n$ is a whole integer equal to at least 100. Specific examples of suitable polymers and details for their formation may be found in the above noted U.S. Pats. Nos. 3,306,874 and 3,306,875.

The polymers are stabilized with a stabilizing quantity of a member selected from the group consisting of phosphites, hydrazines and mixtures thereof. Typical examples of suitable phosphites include, by way of example, phenyldodecyl phosphite, phenylneopentyl phosphite, phenylethylene hydrogen phosphite, triethylene phosphite, dichloroethyl phosphite, tributyl phosphite, trilauryl phosphite, bis(2-ethylhexyl) hydrogen phosphite, phenylbis (3,5,5′-trimethylhexyl) phosphite, mixed 2-ethylhexyloctylphenyl phosphite, cis-9-octadecenyl diphenyl phosphite, 2-ethylhexyl di (p-tolyl)phosphite, allyl phenyl hydrogen phosphite, bis(2-ethylhexyl)p-tolyl phosphite, tridecyl phosphite, bis (2-ethylhexyl)phenyl phosphite, triallyl phosphite, triisooctyl phosphorotrithioite, tributyl phosphorotrithioite, trimethallyl phosphite, tri(nonylphenyl)phosphite, phenyl methyl hydrogen phosphite, bis(p-tert-butyl phenyl) octadecyl phosphite, triamyl phosphite, (p-tert-butylphenyl)di(octadecyl) phosphite, diisopropyl hydrogen phosphite, p-cymyl dioctyl phosphite, dipropyl hydrogen phosphite, di(dodecyl)p-tolyl phosphite, triisooctyl phosphite, decyl bis(p-1,1,3,3-tetramethylbutylphenyl)phosphite, trimethyl phosphite, nonyl bis(p-1,1,3,3-tetramethylbutylphenyl) phosphite, diallyl hydrogen phosphite, diisodecyl p-tolyl phosphite, tricresyl phosphite, diisodecyl phenyl phosphite, triphenyl phosphite, octyl bis(3,5,5-trimethylhexyl) phosphite, dibutyl phenyl phosphite, di-p-tolyl 3,5,5-trimethylhexyl phosphite, 2-chloroethyl diphenyl phosphite, p-tolyl bis(2,5,5-trimethylhexyl) phosphite, diphenyl decyl phosphite, 2-ethylhexyl diphenyl phosphite, tris (2-ethylhexyl) phosphite, tri(octadecyl) phosphite, trioctyl phosphite, tris (2-chloroisopropyl) phosphite, dibutyl hydrogen phosphite, di(dodecyl) hydrogen phosphite, phenyl didecylphosphite, di(tridecyl) hydrogen phosphite, diphenyl hydrogen phosphite.

Typical examples of hydrazines include by way of example, acetylphenyl hydrazine, N,N′-benzylphenyl hydrazine, phenyl hydrazine, N,N′-dilauryl hydrazine, diacetylhydrazine, tetraanisylhydrazine, hydrazine (anhydrous), tetraphenylhydrazine, benzoylhydrazine, adipic acid dihydrazide, 1,1-diphenyl-2-methacrylolylhydrazine, alpha-benzyl-alpha-phenyl-hydrazine, hydrazine hydrate, acetylophenyhydrazine, benzylhydrazine, dimethylhydrazine, 1,1-diphenyl-2-picrylhydrazine, propionylhydrazine, tolylhydrazine, stearoylhydrazide, dodecylhydrazine, 1,1-diphenyl-2-dodecyl-2-acetylhydrazine.

Preferred stabilizers include trilauryl phosphite, trioctadecyl phosphite, diacetyl hydrazine, acetylphenyl hydrazine and hydrazine (anhydrous).

The quantity of stabilizer added to the polyphenylene ether is not critical. Small quantities yield improved results and higher quantities give better results. In general, the concentration may range between 0.01 to 6.0 percent, by weight of the polymer. Increasing concentration dilutes the polymer and tends to impair physical properties. A preferred range comprises from 0.1 to 2.0 percent by weight.

The manner of adding the stabilizer to the polymer is not critical and does not constitute a part of this invention. For example, if the desired stabilizer is soluble in a solvent in which the polymer is also soluble, the polymer and stabilizer may be dissolved with subsequent evaporation of solvent. Alternatively, both the stabilizer and polymer, in powder or pellet form, may be dry-blended using known blending techniques. In addition, the stabilizer may be added during the makeup of the polymer by adding it to a solution of the monomer prior to polymerization.

The following examples are illustrative of the invention, but should not be considered as limiting the invention thereto.

Example 1

A poly(2,6-dimethyl-1,4-phenylene) ether was compounded with various stabilizers by adding both the polymer and the stabilizer to one liter of heptane to form a solution. The solution was then poured into a tray and allowed to stand overnight whereby solvent was evaporated leaving a dry polymer film. This was powdered and extruded at a temperature of from 520 to 600° F., dependent upon the stabilizer and its concentration. The extrudate was passed through a chopper to form pellets and two gram samples were pressed between metal plates at a temperature of from 480 to 550° F. to produce films having an average film thickness of 15 mils. The films were placed in an oven having an air atmosphere and maintained at 150° F. Periodically the films were removed from the oven and tested for flexibility and color. Flexibility was tested by creasing the film strip and bending it 360° back upon itself as many times as necessary to cause breakage along the crease. Color was determined visually. The following results were obtained.

| Additive (wt. percent) | Flexibility, average No. of creases to break in— | | | Color change |
|---|---|---|---|---|
| | 4 days | 5 days | 6 days | |
| No additive | 2½ | ½ | 0 | Considerable darkening. |
| 0.1 trilaurylphosphite | | 3 | ½ | Slight darkening. |
| 0.5 trilaurylphosphite | | 3 | 0 | Do. |
| 1.0 trilaurylphosphite | | 3½ | 0 | Do. |
| 2.0 trilaurylphosphite | 5 | 3½ | 2 | Do. |
| 3.0 trilaurylphosphite | | 3 | 0 | Do. |
| 0.5 trioctadecylphosphite | 5½ | 3½ | 1 | Do. |
| 0.1 triethylene diphosphite | | 3 | 0 | Do. |
| 1.0 phenylneopentylphosphite | | 3 | 0 | Do. |
| 0.25 polygard [1] | 3 | 2 | 0 | Do. |
| 3.0 polygard | 1 | 0 | | Do. |
| 0.5 tridecyl phosphite | | 3½ | 0 | Do. |
| 0.5 phenyldodecylphosphite | | 3½ | 0 | Do. |

[1] Polygard is a mixture of alkylated phenyl phosphites that is a clear amber liquid having a specific gravity of 0.99 and is soluble in all-tone, alcohol, benzene, carbon tetrachloride, solvent naphtha and ligroin.

Example 2

The procedure of Example 1 was repeated with substitution of the following phenolic antioxidants: 2-naphthol, 2-aceto-1-naphthol, diacetyl-p-amino-phenol, t-butyl-catechol, 2,2'-methylenebis(4-methyl) - 6 - tert-butylphenol, and [2,2'-thiobis (4-t-octylphenylate)]-n-butylamine nickel II. In all cases, 2 percent or less antioxidant was employed. The antioxidants failed to significantly improve the oxidation resistance of the polymers. The failure of the phenolic antioxidants to improve the stability of the polyphenylene ether was unexpected as it was anticipated that the organic phosphites and the phenolic antioxidants would behave in a similar manner as they both produce the same effect in other plastics such as polyvinyl chlorides.

Example 3

The procedure of Example 1 was repeated with the substitution of various hydrazines for the organic phosphites. The following results were obtained:

| Additive (wt. percent) | Flexibility, (exposure time at 150° C.) average No. of creases to break in— | | | Color change |
|---|---|---|---|---|
| | 4 days | 5 days | 6 days | |
| No additive | 2½ | ½ | 0 | Considerably darkened. |
| 0.5 N,N'-diacetylhydrazine | 3 | 1 | 0 | Slight darkening. |
| Dibenzoylhydrazine | 3 | 1 | 0 | Do. |
| Acetylphenylhydrazine | 4 | 2 | 1 | Do. |
| Hydrazine (anhydrous) | 3 | 1 | 0 | Do. |

Example 4

The procedure of Example 1 was repeated with the substitution of a binary stabilizing system of a phosphite and a hydrazine for the organic phosphite with the following results.

| Additive composition (wt. percent) | Flexibility, (exposure time at 150° C.) average No. of creases to break in— | | | | Color change |
|---|---|---|---|---|---|
| | 4 days | 5 days | 6 days | 7 days | |
| No additive | 2½ | ½ | 0 | | Considerably darkened. |
| 1.0 trilaurylphosphite, 0.5 acetylphenyl-hydrazine. | 5½ | 4 | 0 | | Slight darkening. |
| 0.5 N,N'-diacetyl-hydrazine, 1.0 trilauryl phosphite. | 6 | 5 | | | Do. |
| 1.0 trilaurylphosphite, 1.0 acetylphenyl-hydrazine, 2.0 hydrazine. | | | 7 | 5½ | Do. |

It should, of course, be apparent to those skilled in the art that various changes may be made in the particular embodiments of the invention described which are within the full intent and scope of the invention as defined by the appended claims.

I claim:

1. A stable polyphenylene ether of the general formula

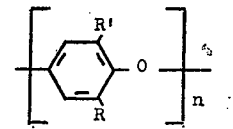

where R and R' are monovalent substituents selected from the group consisting of hydrogen, halogen, hydrocarbon radicals, halohydrocarbon radicals having at least two carbon atoms between the halogen atom and phenyl nucleus, hydrocarbonoxy radicals, and halohydrocarbonoxy radicals having at least two carbon atoms between the halogen atom and phenyl nucleus, and $n$ is a whole integer equal to at least 100; and a stabilizing quantity of an organic phosphite.

2. The composition of claim 1 where the stabilizer comprises from 0.01 to 6.0 percent by weight based upon the polyphenylene ether.

3. The composition of claim 2 where the stabilizer comprises from 0.1 to 2.0 percent by weight of the polyphenylene ether.

4. The composition of claim 2 where R and R' are each methyl.

5. The composition of claim 1 where the organic phosphite is trilauryl phosphite.

6. The composition of claim 1 where the organic phosphite is tridecyl phosphite.

7. The composition of claim 4 also containing as a stabilizer hydrozine or a derivative of hydrozine which contains the structure >N—N<.

8. The composition of claim 4 where the stabilizer is an organic phosphite selected from the group consisting of phenyldodecyl-phosphite, phenylneopentyl-phosphite, phenylethylene-hydrogen phosphite. triethylene-phosphite, trichloroethyl-phosphite, tributyl-phosphite, tridecyl-phosphite, dilauryl-phosphite, trilauryl-phosphite, trilauryl-trithio-phosphite and trioctadecyl-phosphite.

9. The composition of claim 4 also containing as a stabilizer a hydrazine selected from the group consisting of diacetylhydrazine, dibenzoylhydrazine, acetylphenylhydrazine, phenylhydrazine, diphenylhydrazine, N,N'-benzylphenylhydrazine, 1-methyl-1-phenylhydrazine, N,N'-dilauryl-hydrazine, 1,1-dimethylhydrazine and hydrazine (anhydrous).

10. The composition of claim 9 where the hydrazine is anhydrous hydrazine.

11. The composition of claim 9 where the hydrazine is diacetyl hydrazine.

12. The composition of claim 9 where the hydrazine is dibenzoyl hydrazine.

13. A stable polyphenylene ether of the general formula

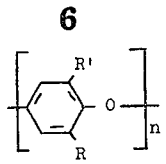

where R and R' are monovalent substituents selected from the group consisting of hydrogen, halogen, hydrocarbon radicals, halohydrocarbon radicals having at least two carbon atoms between the halogen atom and phenyl nucleus, hydrocarbonoxy radicals, and halohydrocarbonoxy radicals having at least two carbon atoms between the halogen atom and phenyl nucleus, and $n$ is a whole integer equal to at least 100; and a stabilizing quantity of a compound selected from the group consisting of hydrazine and a derivative of hydrazine which contains the structure >N—N<.

14. The composition of claim 13 where the stabilizer comprises from 0.01 to 6.0% by weight based upon the polyphenylene ether and R and R' are each methyl.

15. The composition of claim 14 where the hydrazine is selected from the group consisting of diacetyl hydrazine, dibenzoyl hydrazine, acetylphenyl hydrazine, phenyl hydrazine, diphenylhydrazine, N,N'-benzylphenylhydrazine, 1-methyl-1-phenyl-hydrazine, N,N' - dilauryl hydrazine, 1,1-dimethylhydrazine and hydrazine (anhydrous).

References Cited
UNITED STATES PATENTS 3,306,874  2/1967  Hay _____ 260—47
3,306,875  2/1967  Hay _____ 260—47

DONALD E. CZAJA, Primary Examiner

V. P. HOKE, Assistant Examiner

U.S. Cl. X.R.

260—45.7 P, 45.75 N, 45.95 R

PO-1050
(5/69)

UNITED STATES PATENT OFFICE
CERTIFICATE OF CORRECTION

Patent No. 3,639,334        Dated February 1, 1972

Inventor(s) Klause E. Holoch

It is certified that error appears in the above-identified patent and that said Letters Patent are hereby corrected as shown below:

Column 5, line 14 (both occurrences), correct "hydrozine" to read -- hydrazine --.

Signed and sealed this 23rd day of January 1973.

(SEAL)
Attest:

EDWARD M. FLETCHER, JR.
Attesting Officer

ROBERT GOTTSCHALK
Commissioner of Patents